United States Patent Office 2,995,162
Patented Aug. 8, 1961

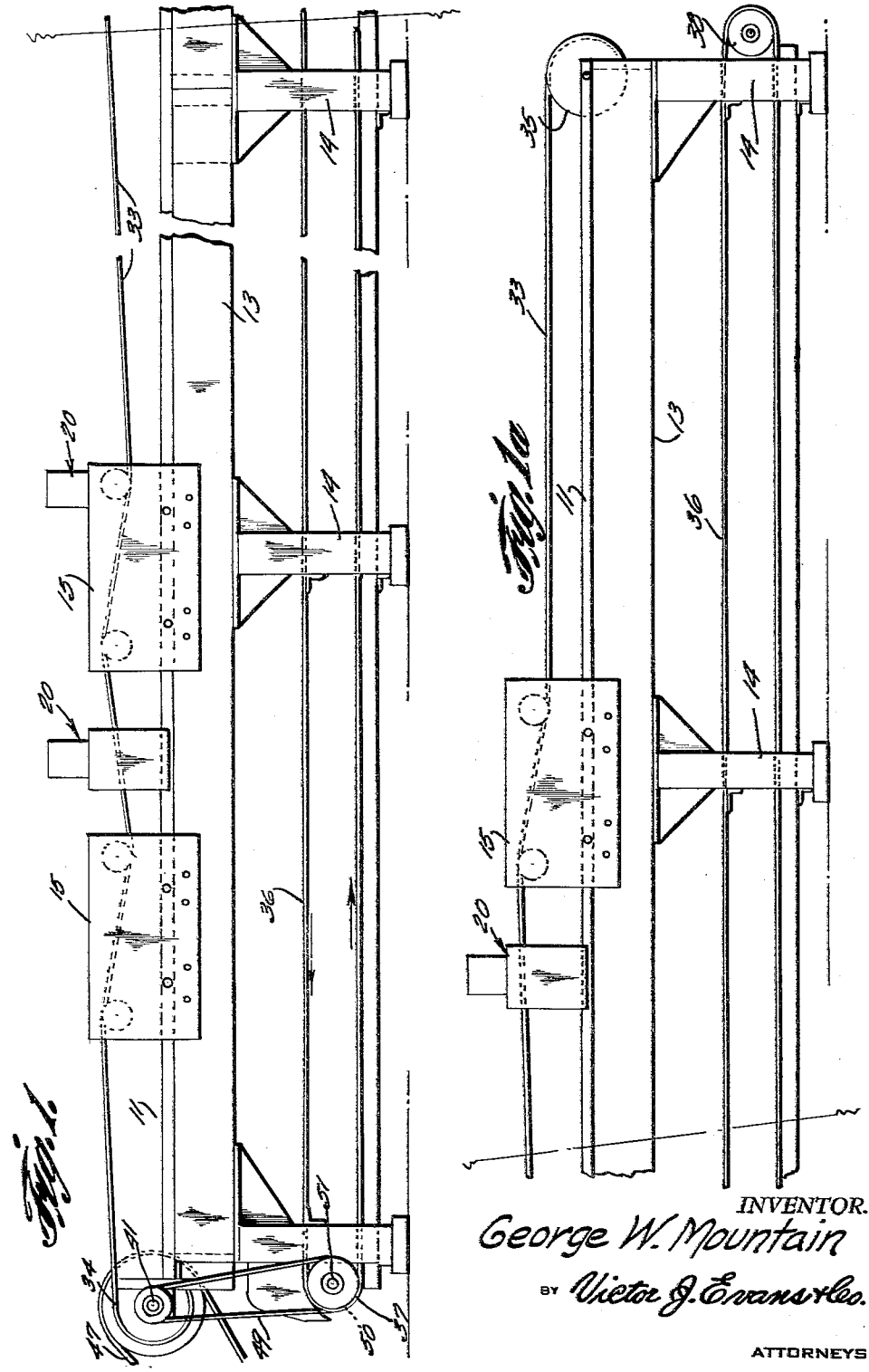

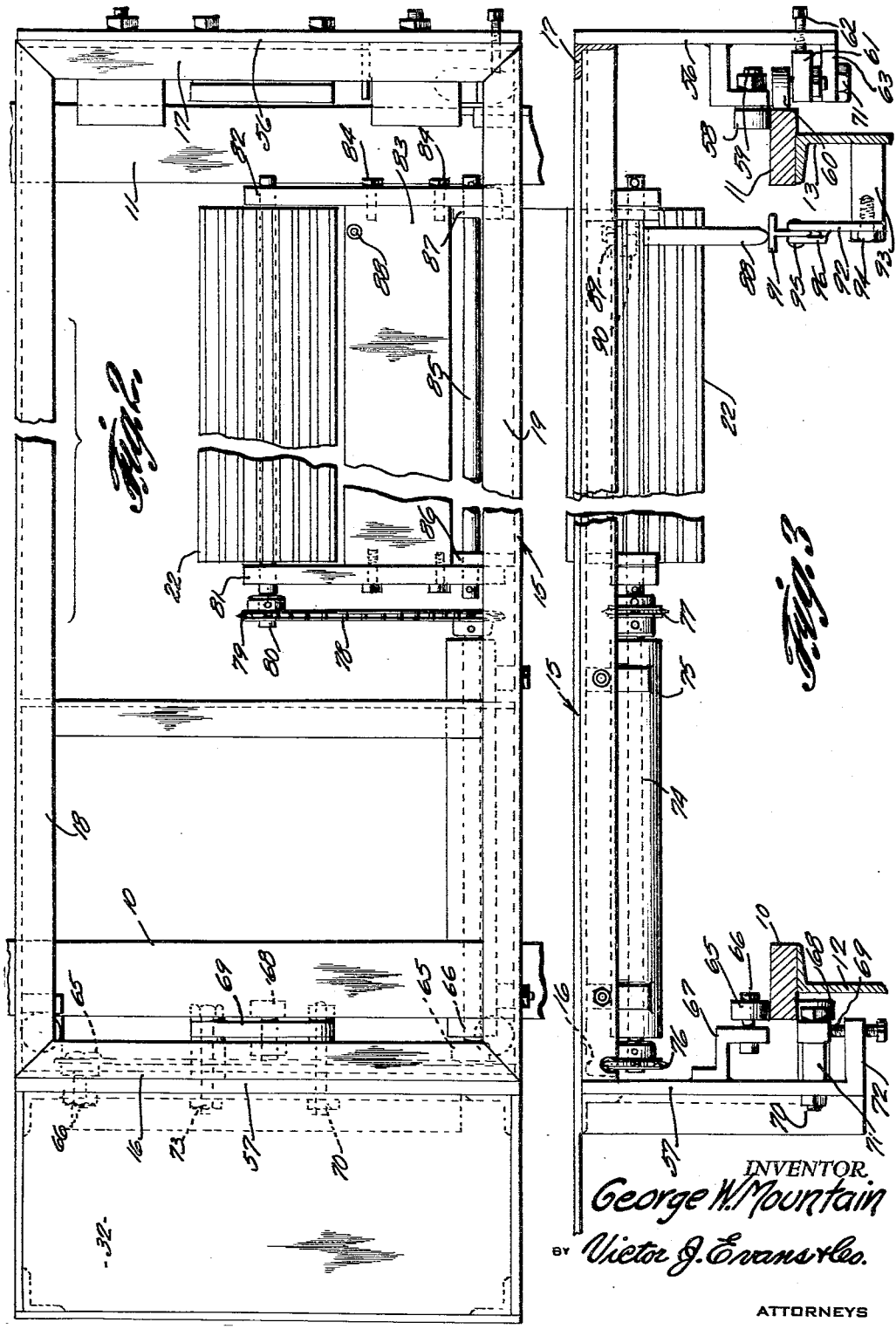

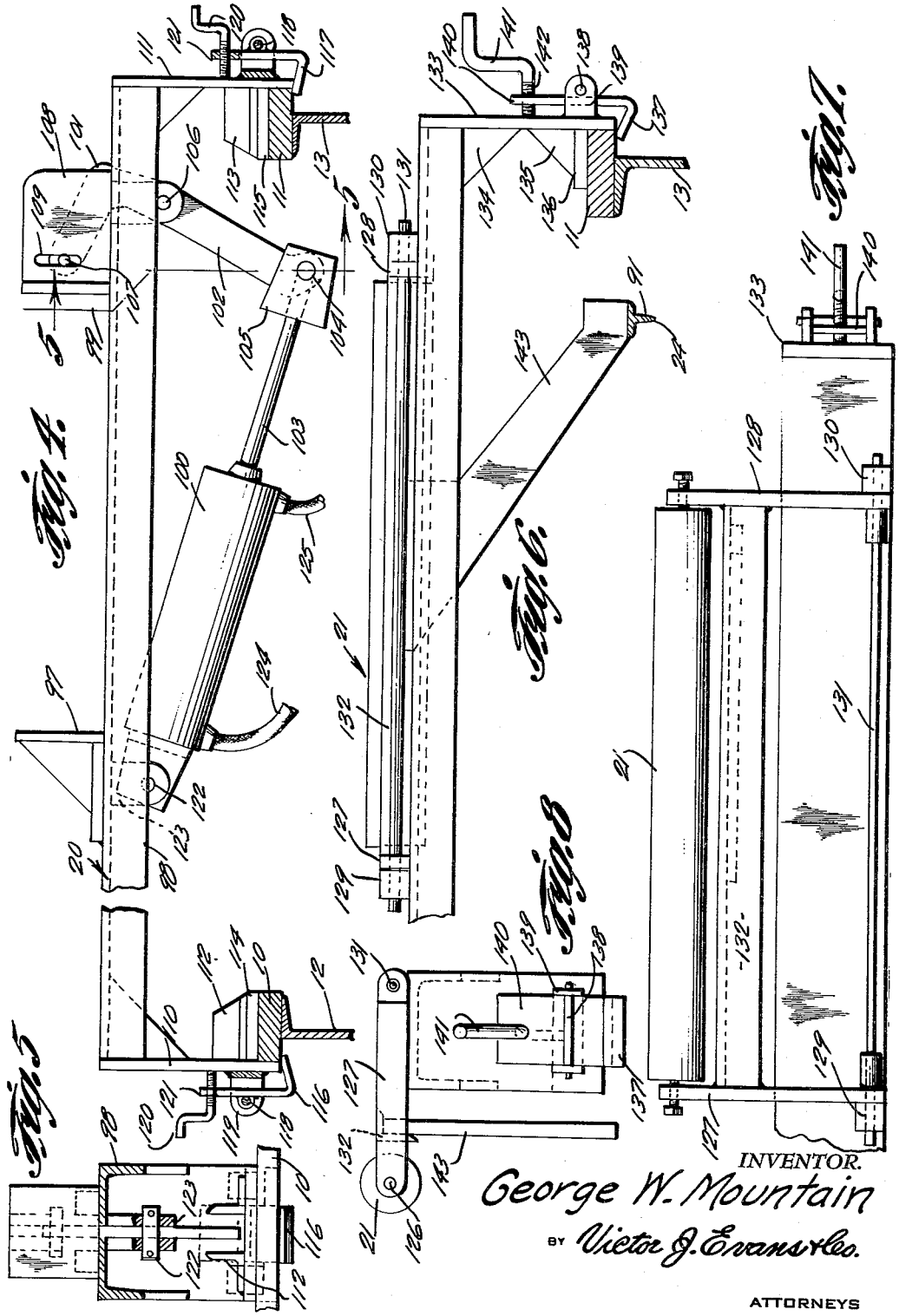

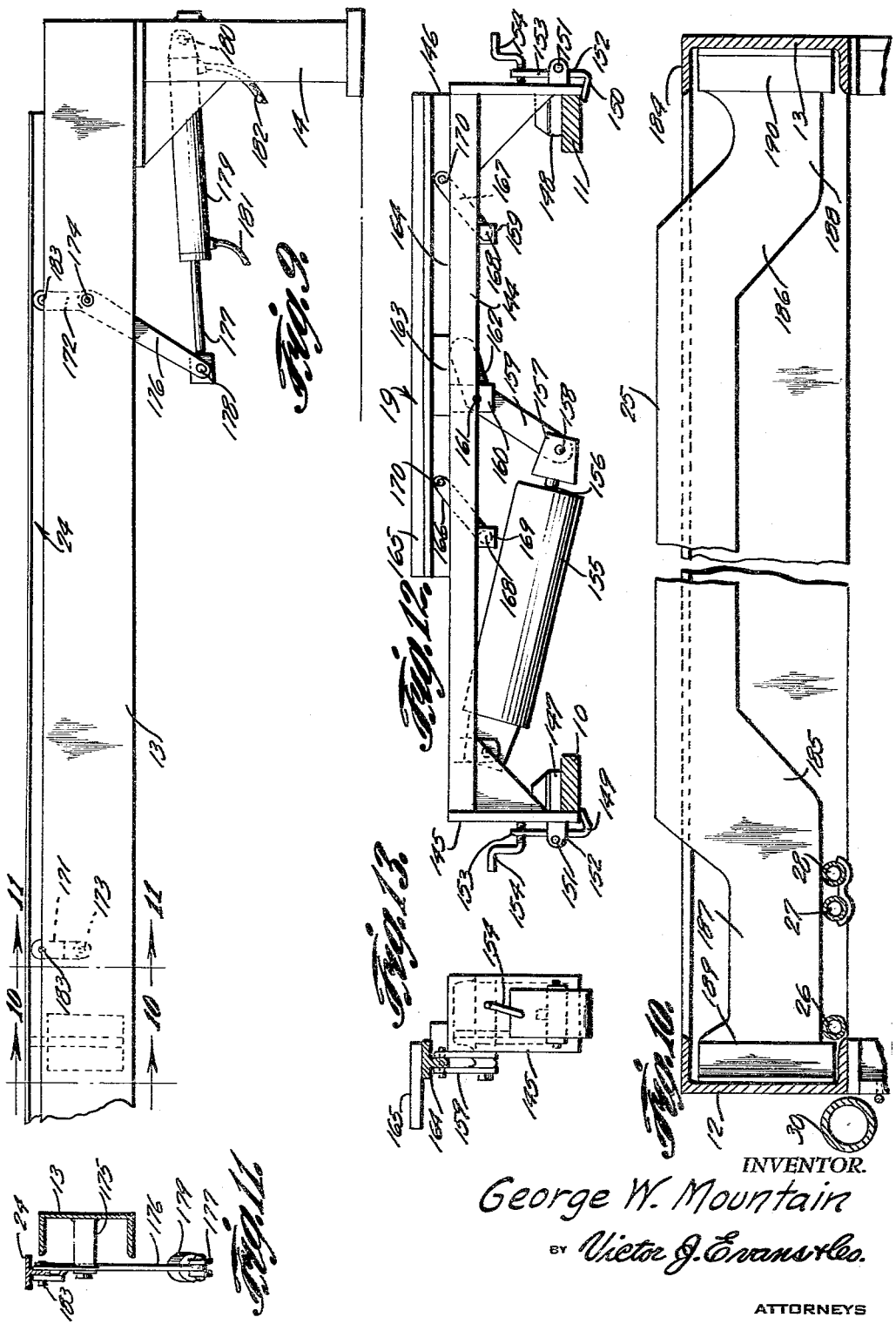

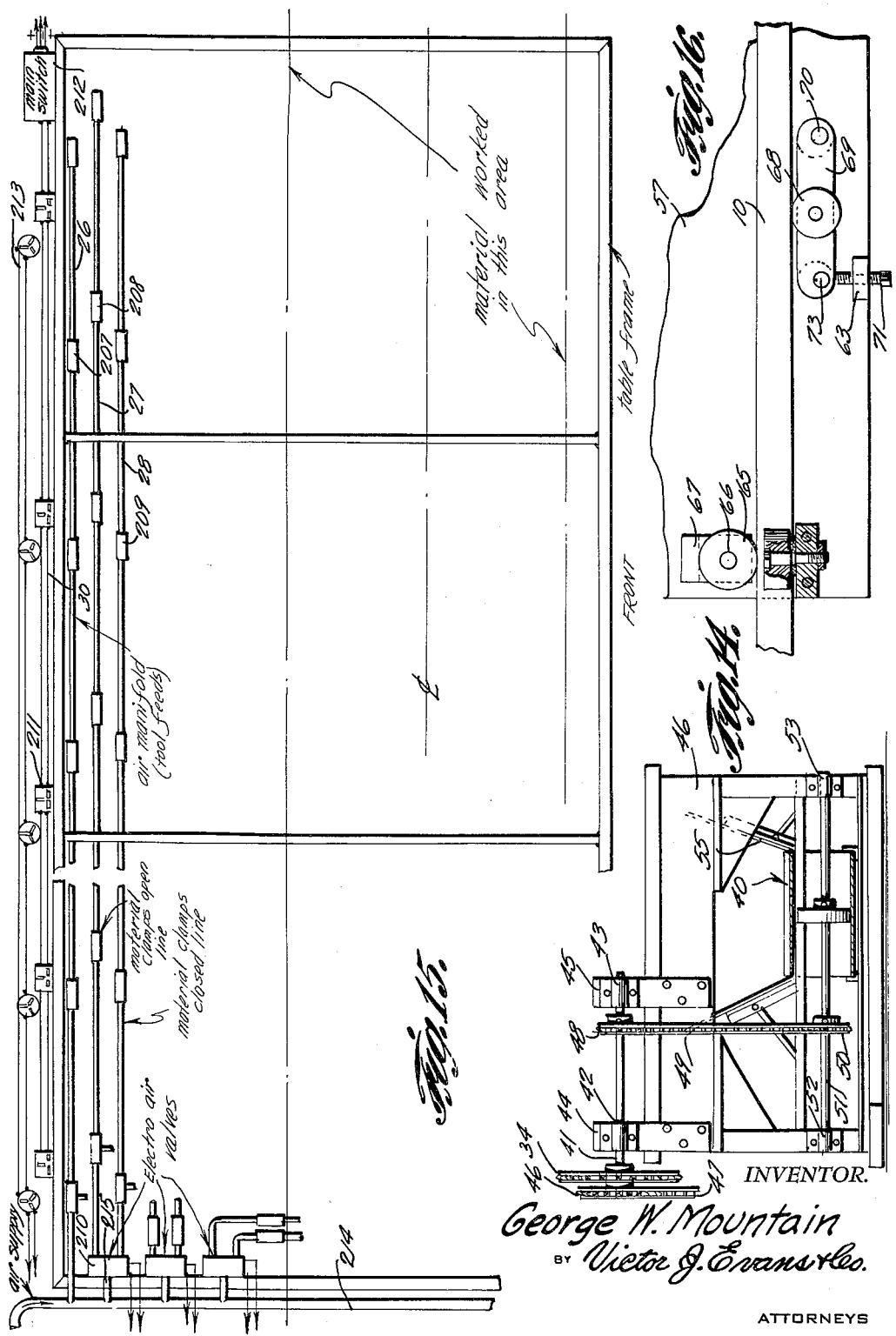

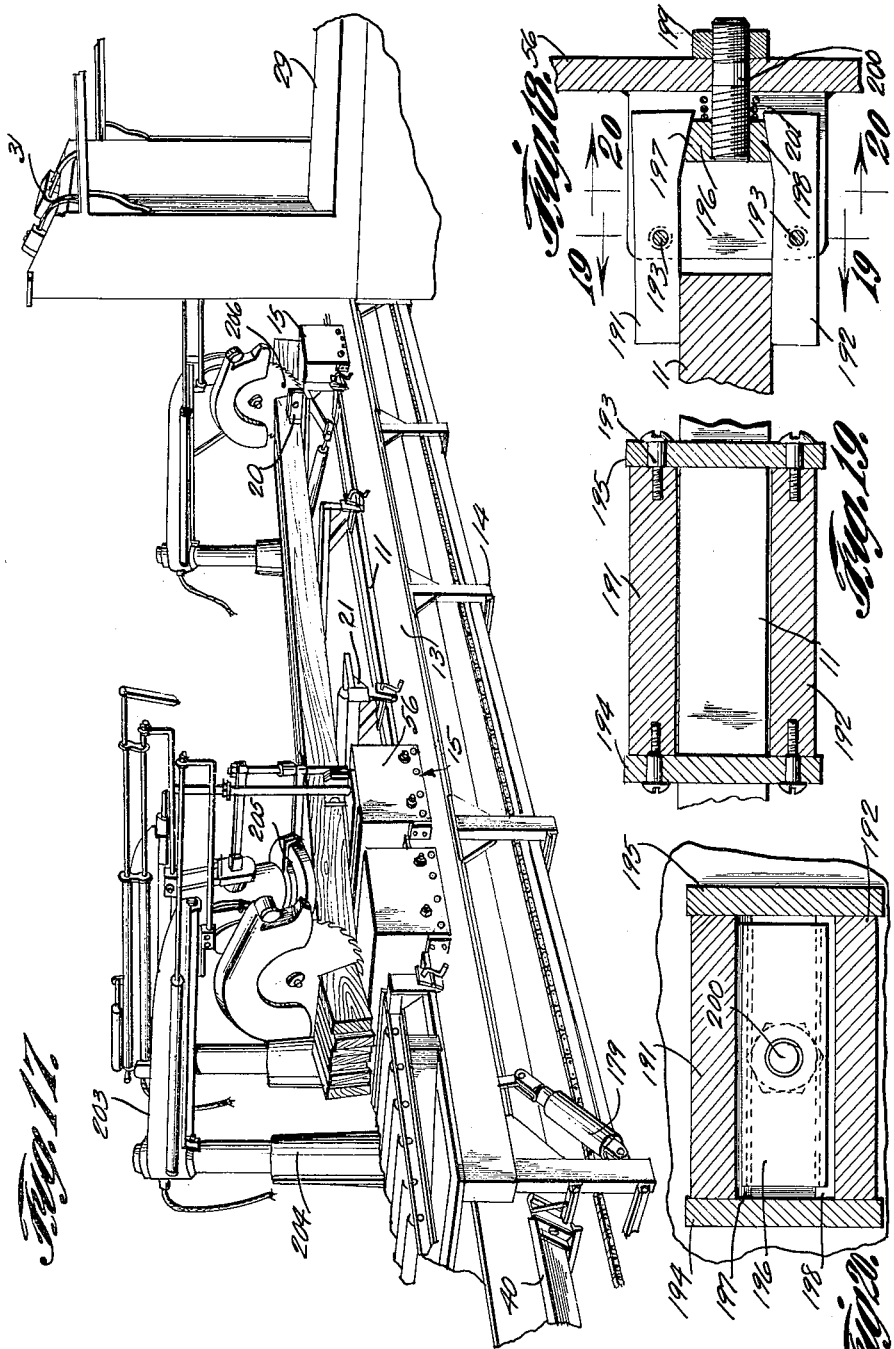

2,995,162
COMPACT POWER SAWING MACHINE
George W. Mountain, P.O. Box 260, Courtney, Pa.
Filed Dec. 16, 1959, Ser. No. 860,041
2 Claims. (Cl. 144—3)

This invention relates to a tool including a plurality of power saws for mass production of pre-cut lumber, such as roof rafters, roof supports, studding, joists, door and window frames and pre-cut lengths of sheeting and freight lumber, and in particular, a plurality of saws mounted in different positions and at different angles on a table or frame having material clamps, material stops, material rollers and tool carriages thereon, with air headers and electric cables for connecting the saws and other elements to a control station wherein a single operator may control the operation of the machine from a remote point and wherein parts of the machine are readily set up for different operations.

The purpose of this invention is to provide a neat, compact power sawing machine including a plurality of saws adjustably mounted on a common frame with a plurality of work holding elements, and requiring a minimum of floor space.

Various types of combinations of power saws have been provided, particularly in saw mills and the like. However, in power saws of this type the saws are suspended by swinging frames above a table or the like and in numerous instances it is not desired to cut an arc, and furthermore it is impossible to suspend the saw from supporting elements above a table. In other arrangements the saws are mounted on a cross-arm, the base of which is rigidly mounted on a stationary bench or table, so that rapid set-up for different operations is not obtained. With this thought in mind this invention contemplates a multiple sawing machine wherein clamps are provided for retaining material in position on the upper surface of a table or frame and saws or other tools are carried by a tool carriage mounted to travel on the frame and positioned to cut material retained in position by the clamps.

The object of this invention is, therefore, to provide a multiple sawing machine in which various operations, performed by tools on material clamped in the machine are controlled by a single operator from a remote point.

Another object of the invention is to provide a multiple sawing machine in which the parts are readily set up to operate in a different arrangement.

Another important object of the invention is to provide a multiple tool operating machine in which power tools are actuated by air and electricity and in which numerous outlets are provided so that the tools may be set up and connected to air or electricity at different points on the machine.

A further object of the invention is to provide a multiple tool operating machine in which the tools are controlled by a single operator at a control station in which the control station is positioned so that the operator has full view of all operations of the machine.

A further object of the invention is to provide a multiple sawing machine which is comparatively neat and compact and requires minimum floor space in which the machine is of a simple and economical construction.

With these and other objects and advantages in view the invention embodies a power tool assembly including a table or frame having spaced parallel table rails with material clamps, material stops and idler rollers mounted in combination with the rails, with tool carriages having material rollers thereon mounted to travel in relation to material clamped on the machine and with air ducts and electric cables having numerous outlets therein extended from a control station throughout the length of the machine.

Other features and advantages of the invention will appear from the following description taken in connection with the drawings, wherein:

FIGURE 1 is a front elevational view of one end of the machine with the opposite end broken away.

FIGURE 1-A is a similar view showing the end of the machine opposite to the end shown in FIGURE 1.

FIGURE 2 is a plan view showing the top elevation of a tool carriage with the top plate removed to show its position on the table rails, the material roller assembly, and the clamps for securing the carriage at any position along the table rails.

FIGURE 3 is a side elevational view of the tool carriage shown in FIGURE 2, with parts broken away showing the positions of the table rails, the carriage rollers, and the material roller.

FIGURE 4 is a section through the frame of the machine showing a material clamp positioned on the side rails of the machine.

FIGURE 5 is a section through one end of the material clamp taken on line 5—5 of FIGURE 4 showing the movable jaw of the clamp.

FIGURE 6 is a section through one side of the machine illustrating the mounting of an idler roller.

FIGURE 7 is a top elevation of the idler roller shown in FIGURE 6.

FIGURE 8 is an end elevational view of the idler roller illustrated in FIGURES 6 and 7.

FIGURE 9 is a section through the machine illustrating the mounting of a roller lifter at one side of the machine.

FIGURE 10 is a section through the machine illustrating the mounting of a cross brace with the roller lifter omitted, said section being taken on line 10—10 of FIGURE 9.

FIGURE 11 is a cross-section taken on line 11—11 of FIGURE 9 also showing the roller lifter assembly.

FIGURE 12 is a section through the machine showing the material stop mounted on the rails of the machine.

FIGURE 13 is an end elevational view of the material stop shown in FIGURE 12.

FIGURE 14 is an end elevational view of the machine with parts omitted illustrating a conveyor trough for removing waste material from the machine.

FIGURE 15 is a diagrammatic view illustrating the relative position of the air duct or header and electric cables.

FIGURE 16 is a section through a part of the tool carriage showing one of the table rails with other parts omitted and showing, in particular, an arrangement of the carriage rollers.

FIGURE 17 is a perspective view of the table, with parts broken away, showing saws mounted on tool carriages and illustrating the use of the machine for cutting roof rafters with a plurality of rafters cut in a single operation.

FIGURE 18 is a section through one of the tool carriers showing a carriage clamp for retaining the carrier in position on the table.

FIGURE 19 is a cross-section through the carriage clamp taken on line 19—19 of FIGURE 18.

FIGURE 20 is a section through the carriage clamp taken on line 20—20 of FIGURE 18.

Referring now to the drawings wherein like reference characters denote corresponding parts the improved multiple sawing machine of this invention includes a frame or stand having longitudinally disposed table rails 10 and 11 positioned on side beams 12 and 13 supported by posts 14, tool carriages 15 having angle bars 16 and 17 at the ends and 18 and 19 at the sides, material clamps 20 positioned on the table rails 10 and 11, idler rollers 21 FIGURES 6 and 7 also positioned on the table rails 10 and 11 for facilitating travel of material through the machine, material rollers 22 FIGURES 2 and 3 mounted on the tool carriages, material clamps 20 FIGURE 4 mounted on the table rails, roller lifters 24 FIGURES 9 and 11 also mounted on the frame, cross braces 25 FIGURE 10 for reinforcing the frame, a single compressed air manifold or header 26 FIGURE 15 extended throughout the length of the frame, a double air manifold or header including sections 27 and 28 extended from a double acting electro-air valve for opening and closing the material clamps simultaneously, and a control station or platform 29 FIGURE 17 whereby tools, saws, and other operations may be controlled by a single operator.

In addition to the compressed air supply duct or headers 26, 27 and 28 the machine is also provided with an electrical conduit 30 FIGURE 15 which also extends throughout the length of the machine and the conduit is provided with plug receiving sockets or receptacles that are spaced at intervals throughout the length of the machine for plugging in the tool driving motor magnetic switches. The switches are operated by plugging in push button lines from the switches into the electrical conduit 213 which is connected to a push button 31 at the control station or panel 29. The conduits 26, 27 and 28 are also provided with branch connections whereby air driven tools, saws, and the like may be connected at suitable points.

Electric saws are mounted on the tool carriages, as shown in FIGURE 17 and other power tools may be mounted on extensions or platforms at the ends of the tool carriages as indicated by the numeral 32. Two by sixes, or other material fed over the rollers 21 by the rollers 22 and secured by the material clamps 20 may be cut to provide roof rafters, roof supports, door frames, studding, and the like.

The machine is provided with an endless driving chain 33 that is trained over sprockets 34 and 35 which drive the feed rollers and also an endless conveyor chain 36 that is trained over sprockets 37 and 38 in the lower part of the frame. The lower chain 36 is provided with flights 39 which travel in a trough 40 FIGURE 14 for carrying waste from the different operations of the machine. The sprocket 34 is mounted on a shaft 41 rotatably mounted in bearings 42 and 43 on bars 44 and 45, respectively, extended upwardly from the end wall 46 of the machine frame. The shaft 41 is provided with a pulley or sprocket 46 that is driven by a motor or other source of power through a belt or chain 47. The shaft 41 is also provided with a sprocket 48 over which an endless chain 49 is trained and the lower end of the chain 49 is trained over a sprocket 50 on a shaft 51 on which the pulley or sprocket 37 is mounted. The shaft 51 is rotatably mounted on the frame by bearings 52 and 53.

The trough 40 is provided with a base section having upwardly inclined side walls 54 and 55 and as blocks, or other pieces of material are cut from the lumber clamped in the machine these parts drop into the trough and are carried by the conveyor to the far end of the frame.

The tool carriages are provided with front aprons 56 and rear aprons 57 and, as illustrated in FIGURE 3, rollers 58 rotatably mounted on bolts 59 are positioned at each end of the front aprons and the rollers are positioned to travel on the upper surface of the table rails 10 and 11. The front aprons are also provided with rollers 60 that are rotatably mounted in brackets 61, controlled by cap screws 62 and the brackets are positioned so that the rollers 60 travel against the edge of the rail 11. By mounting the brackets 61 in this manner the edge rollers 60 are adjustable in relation to the edge of the rail. The front apron is also provided with lugs 63 in which set screws 71 are positioned, and the front apron also includes a pair of gripping clamps 191 and 192 FIGURES 18 to 20 for locking the tool carriage at any position along the table rail 11. The clamps 191 and 192 are secured in position by tightening the hexagonal nuts 199 shown on the outside of the front apron 56 which are centered with the clamps.

The rear apron 57 is provided with upper rollers 65 that are spaced inwardly from ends of the apron and the rollers 65 are mounted by a pin 66 in brackets 67 that are secured, such as by welding, to the inner face of the apron. The rear apron is also provided with a center roller 68 that travels on the lower surface of the rail 10 and the roller 68 is rotatably mounted in an arm 69, which is pivotally mounted on the apron by pins 70 and 73. The arm 69 is adjusted by a set screw threaded in a lug 63 extended from the face of the rear apron as in the front apron.

The tool carriage 15 is provided with a transversely disposed shaft 74 FIGURE 3 which is mounted in an elongated sleeve 75 and one end of the shaft is provided with a sprocket 76 that meshes with the chain 33 extended throughout the length of the machine whereby the shaft 74 is rotated and a sprocket 77 on an inner end and over which a chain 78 is trained, is rotated. The chain 78 is also trained over a sprocket 79 FIGURE 2 on a shaft 80 of the feed roller 22 providing means for rotating the shaft.

The feed roller 22 is positioned between end bars 81 and 82 which are mounted on the platform 83 by bolts 84, and a shaft 80 upon which the roller 22 is positioned is rotatably mounted in extended ends of the bars. A shaft 85 positioned in the opposite ends of the bars 81 and 82 provides a hinged pin of the material roller assembly being secured in blocks 86 and 87 that are welded to the frame of the tool carriage thereby permitting the power driven material roller to raise and lower.

The feed roller 22 is also provided with a roller push rod 88 that is secured in position by nuts 89 and 90 and the lower end of the push rod is positioned to travel on the T-bar or roller lifter 24 secured by a link 92 to a bracket 93 extended from the channel bar 13. The link 92 is secured to the bracket 93 by a bolt 94 and the T-bar 91 is secured to the link 92 by a pin 95 with a brace 96 positioned on the pin and secured to one side of the link.

The material clamp shown in FIGURES 4 and 5 is provided with a stationary jaw 97 which is mounted on a cross channel bar 98 and a movable jaw 99 which is actuated by an air cylinder 100 through a bell crank 101 whereby upon outward movement of a piston rod 103 the movable jaw 99 is actuated towards a stationary jaw 97 for clamping material between the jaws. The extended end of the piston rod 103 is mounted by a pin 104 in a clevis 105 on the end of the piston rod, to the bell crank 101 which is pivotally mounted on a pin 106. The upper end of the bell crank is connected by a pin 107 to a block 108. The block 108, upon which the movable jaw 99 is positioned, is provided with a vertically disposed slot 109 in which the pin 107 is positioned.

The channel bar 98 is supported by depending end plates 110 and 111 which are positioned against outer edges of the table rails 10 and 11 and which are provided with clip angles 112 and 113 which rest upon bearing plates 114 and 115 that are positioned on the rails.

The material clamps are secured in position by gripping jaws 116 and 117, each of the jaws being pivotally mounted on a pin 118 in the bearing 119 and actuated by a hand crank 120 threaded in upper ends 121 of the jaws.

The cylinder 100 of the material clamps 20 as shown in FIGURE 4 is pivotally mounted by a pin 122 in bearings 123 on the inner surface of the channel bar 98 and the cylinder 100 is provided with air hose connections 124 and 125.

The idler rollers 21 which are mounted by screws 126 as shown in FIGURES 6, 7 and 8, are provided at different points throughout the length of the table or frame and the rollers 21 are pivotally mounted by links 127 and 128 in bearings 129 and 130 by a shaft 131 and the bearings are mounted on a cross channel bar 132 supported by end plates 133 from the table rails 10 and 11, as shown in FIGURE 6. The end plates 133 are provided with upper braces 134 and lower braces 135. The lower portions of the braces 135 are provided with flanges 136 that rest upon the rails 10 and 11 and the rollers are secured in position by gripping jaws 137 pivotally mounted by pins 138 in bearings 139 on outer surfaces of the end plates 133; and upper ends 140 of the jaws 137 are provided with hand cranks 41, having ends 142 that are threaded in the ends 140 of the jaws. The angle bars 132 are supported by diagonally positioned braces 143, the lower ends of which rest upon the roller lifter 24 upon which the supports 88 of the feed rollers are positioned. The roller lifters 24 are mounted on the channel bars 13 by brackets, as illustrated in FIGURES 3, 9 and 11.

The material stops 19, as illustrated in FIGURES 12 and 13 are each provided with a channel bar 144 carried by end plates 145 and 146, and the end plates are provided with inwardly extended clip angles 147 and 148 that rest upon the table rails 10 and 11. The end plates 145 and 146 are also provided with gripping jaws 149 and 150 which are pivotally mounted by pins 151 in bearings 152 and upper ends 153 of the jaws are provided with threaded openings in which hand cranks 154 are threaded.

The material stops are provided with air pressure cylinders 155, each of the piston rods 156 of which is provided with a clevis 157 that is connected by a pin 158 to a bell crank 159 that is pivotally mounted in bearings 160 by pins 161. Extended ends 162 of the bell cranks engage under surfaces of bearings blocks 163 on T-bars 164 of the adapter plates or material barriers 165; whereby upon outward movement of the piston rods the adapter plates are moved upwardly by the upper end 162 of the bell crank. The T-bar is retained in a parallel position by links 166 and 167, pivotally mounted by pins 168 in bearings 169, at the lower end and pivotally connected to the T-bar by pins 170.

The lifter bar 24, illustrated in FIGURES 9 and 11, is mounted on the inner surface of the channel bar 13 by links 171 and 172 which are pivotally mounted by bolts 173 and 174 in bearings 175 extended from the inner surface of the channel bar and the link 172 is connected by an arm 176 to a piston rod 177 by a pin 178. The piston rod 177 extends from a cylinder 179 which is pivotally mounted by a pin 180 on one of the posts 14 of the machine frame. The cylinder 179 is provided with air connections 181 and 182 by which the piston rod may be actuated. The lifting bar 24 is shown in the upper position in FIGURE 9 and as the piston rod 177 is retracted the bar 24 is lowered. The bar 24 is pivotally mounted in upper ends of the links 171 and 172 by bolts 183.

The channel bars 12 and 13 are retained in spaced relation by cross braces 25 FIGURE 10, the intermediate portions of which extend upwardly above upper flanges 184 of the channel bars to provide clearance for the waste conveyor, as illustrated in FIGURE 10, and from the upwardly extended portion 25 the braces are inclined downwardly with sections 185 and 186 which are connected to end sections 187 and 188 that are connected by clip angles 189 and 190 to the channel bars 12 and 13, by welding or the like.

The tool carriages are retained in position by carriage clamps, as illustrated in FIGURES 18, 19 and 20, including gripping jaws 191 and 192 pivotally mounted by screws 193 in side plates 194 and 195. The jaws are actuated by a spreader 196 positioned to co-act with inclined surfaces 197 and 198 and actuated by a nut 199 on a stud 200 extended through the front apron 56 of the tool carriage. A spring 201 is positioned between the front apron 56 and the spreader 196 for urging the spreader to a releasing position. The jaws 191 and 192 are positioned to grip a front table rail 11, as shown in FIGURE 18.

In the design illustrated in FIGURE 17 saws 202 are carried by arms 203 on posts or holders 204 on the tool carriages and with the saw 202 set at a slight angle and a co-acting saw carried by a spindle 205 on another tool carriage at a different angle a plurality of roof rafters may be cut in one portion and the opposite ends may also be cut by a saw 206 on a tool carriage at the opposite end of the machine. Ends cut from the joists or rafters drop into the refuse conveyor 40 and are carried to an end of the machine.

The roller lifter bar 24, which extends throughout the length of the machine is raised and lowered by the pressure cylinder 179.

Each of the valve connections 207 of the single air header 26 is a source of air to supply the air feed cylinders of the power tools. These cylinders have an electrically operated valve and being inter-connected, all feed cylinders are controlled from the control station. Each of the valve connections 208 of the tube 27 are for connection to the hose connections 124 of the cylinders 100 on the material clamps as shown in FIGURE 4. Each of the valve connections 209 of the tube 28 are for connection to the hose connections 125 of the cylinders 100 on the material clamps as shown in FIGURE 4, providing means for disconnecting the clamps. The tubes 27 and 28 being connected to the electrically operated air valve 210 which is operated from the control station or panel, makes it possible for the operator to clamp or disconnect all material clamps thus connected.

All sockets 211 of the electric conduit 30 are energized through the main switch 212 FIGURE 15. All other sockets on the electric conduit 213 are connected to the control panel or station. The push button cords on the magnetic switches of the power tools or saws are plugged into the sockets. By this means the power tools or saws are started or stopped from the control station or panel.

Electric switches are provided for the feeding cylinders of the power tools, the roller lifting bar, the material stop, the waste conveyor, and material rollers.

*Air headers and electric conduits*

The multiple sawing machine is provided with a single air header 26 that extends from a compressed air supply pipe 214 and a double air header or manifold including tubes 27 and 28. The machine is also provided with the electrical cable 30 having wall sockets or outlets 211 therein by which cords to magnetic switches of machine tools or saws may be plugged in at any point throughout the length of the machine. The compressed air headers 26, 27 and 28 also extend throughout the length of the machine and the air headers are provided with outlet valves 207, 208 and 209 by which saws and other tools may be connected to air supply headers at different points throughout the length of the machine.

The double air header including the conduits 27 and 28 extends from the electric control valve 210 the intake side of which is connected by a tube 215 to the supply tube 214.

*Operation*

The multiple sawing machine of this invention is an assembly of mechanical and electrical elements to provide a compact unit designed to save labor and expedite processing of duplicated items such as pre-cut lumber and particularly roof rafters, roof supports, studding, joists, sheetings and crate lumber and also window and door frames.

The machine is designed and compactly assembled whereby all necessary parts are mounted in an orderly fashion, presenting a neat appearance and requiring a minimum of floor space, the individual tools and other parts are readily changed to substitute one tool for another and a single operator controls the operation of the machine from a control station.

The machine includes a table, tool carriages, material clamps, idler rollers, a lifting bar and a material stop.

The table or frame is of sufficient length to accommodate the longest pieces of material to be processed. The table includes parallel rails which extend the full length of the table with suitable supporting bars, posts, and cross members. An air manifold with numerous outlets equipped with speed valve hose couplings extends throughout the length of the table for supplying air to electrically actuated feeding cylinders of power tools on tool carriages of the machine. The table is also equipped with a double air manifold also having numerous outlets equipped with speed valve hose couplings and this manifold supplies air for opening and closing the material clamps simultaneously. Both manifolds are controlled by push buttons at a control station. The control station is also provided with an electric switch or switches for controlling the operation of the motors of the power tools, couplings and valves.

A roller lifter bar supported from the table by cantilevers extends throughout the length of the table for raising and lowering the idler rollers and the material rollers mounted on the carriages and actuated by an air cylinder through a bell crank and connecting levers.

A power unit mounted on the table and positioned at one end thereof for driving an intermediate shaft which drives an endless chain in the bottom of a trough providing a waste conveyor.

The table or frame is provided with tool carriages having metal platforms upon which saws or other tools are bolted. Each tool carriage is provided with front and rear aprons and stabilizing elements on lower edges of the aprons co-act with the table rails for positioning and operating the tool carriages.

The tool carriages are also provided with a material roller that is raised and lowered through an opening in the platform by a push rod pressing upon the listing bar in the table. The material roller is actuated by chains and sprockets through an intermediate shaft assembly powered by the chain running the length of the table. The material roller is mounted in the work area of the tool carriages and positioned at a right angle to the table rail. The material roller is positioned to accommodate the greatest possible number of pieces positioned side by side for processing with a single operation.

Material clamps including stationary and movable jaws are mounted on the frame and positioned to grip the table rails. The material clamps retain the material in position for sawing.

Idler rollers are also provided for facilitating the movement of material through the machine and the unit is also provided with a material stop for limiting movement of the material through the machine.

The different tools, operating elements and parts are provided with push button control which makes it possible for the elements to be operated by a single operator.

It will be understood that modifications, within the scope of the appended claims, may be made in the design and arrangement of the parts without departing from the spirit of the invention.

What is claimed is:

1. A multiple saw machine comprising an elongated frame, spaced parallel rails mounted longitudinally in the frame, tool carriages mounted in the frame and positioned by and upon said parallel rails, material clamps mounted in the frame adjacent said carriages and also positioned by said parallel rails for retaining material in position for working by tools on said carriages, a material stop mounted in and transversely of the frame and positioned to limit longitudinal travel of material therein, and material rollers mounted in and transversely of the frame and positioned to facilitate longitudinal movement of material in the frame.

2. In a multiple tool assembly, the combination which comprises an elongated horizontally disposed frame, spaced parallel rails mounted longitudinally in the frame, tool carriages mounted in the frame and on the rails and positioned to co-act with the rails for positioning the carriages longitudinally of said frame, a material clamp mounted in the frame on and positioned by said rails adjacent at least one carriage for retaining material in position for cutting by a tool on said carriage, a material stop mounted in and transversely of the frame for limiting longitudinal movement of material therein, idler rollers mounted in and transversely of the frame for facilitating longitudinally travel of material therethrough, material rollers mounted in the frame for facilitating positioning material therein, a conveyor for carrying waste material from the frame, and air and electric conduits provided with spaced outlets extended throughout the length of the frame for supplying power to the clamp and tool wherever they may be positioned in the frame.

References Cited in the file of this patent

UNITED STATES PATENTS

| | | |
|---|---|---|
| 795,671 | Whitfield | July 25, 1906 |
| 1,479,464 | Fuller | Jan. 1, 1924 |
| 1,700,683 | Madsen | Jan. 29, 1929 |
| 1,740,555 | Warmoth | Dec. 24, 1929 |
| 1,767,012 | Pfau | June 24, 1930 |
| 2,662,563 | Grove | Dec. 15, 1953 |
| 2,719,551 | Baldwin et al. | Oct. 4, 1955 |
| 2,741,277 | Leger | Apr. 10, 1956 |
| 2,785,708 | Krogen | Mar. 19, 1957 |
| 2,814,319 | Hetman et al. | Nov. 26, 1957 |
| 2,901,245 | Hensley | Aug. 25, 1959 |

FOREIGN PATENTS

| | | |
|---|---|---|
| 972,017 | Germany | May 6, 1959 |